(12) United States Patent
Sugiura et al.

(10) Patent No.: US 9,032,914 B2
(45) Date of Patent: May 19, 2015

(54) INTAKE SYSTEM FOR INTERNAL COMBUSTION ENGINE

(71) Applicant: DENSO CORPORATION, Kariya, Aichi-pref. (JP)

(72) Inventors: Yoshihiko Sugiura, Anjo (JP); Masao Ino, Toyota (JP); Sadayuki Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 45 days.

(21) Appl. No.: 13/856,193

(22) Filed: Apr. 3, 2013

(65) Prior Publication Data

US 2013/0263797 A1    Oct. 10, 2013

(30) Foreign Application Priority Data

Apr. 5, 2012    (JP) .................................. 2012-86672

(51) Int. Cl.
*F01P 3/14* (2006.01)
*F01P 1/08* (2006.01)
*F01P 3/00* (2006.01)
(Continued)

(52) U.S. Cl.
CPC ............... *F01P 3/00* (2013.01); *F01P 2060/02* (2013.01); *F01P 2060/16* (2013.01); *Y02T 10/146* (2013.01); *Y02T 10/121* (2013.01); *F02M 35/10222* (2013.01); *F02M 35/10268* (2013.01); *F02M 35/116* (2013.01);
(Continued)

(58) Field of Classification Search
CPC .................. F02M 35/10052; F02M 35/10268; F02B 29/0412; F02B 29/0437; F02B 29/0462; F02B 29/0475

USPC ....................................................... 123/41.01
See application file for complete search history.

(56) References Cited

U.S. PATENT DOCUMENTS

2012/0255513 A1    10/2012    Ino et al.

FOREIGN PATENT DOCUMENTS

| JP | 8-291715 | 11/1996 |
| JP | 2001-248448 | 9/2001 |

(Continued)

OTHER PUBLICATIONS

Office Action (2 pages) dated Jun. 17, 2014, issued in corresponding Japanese Application No. 2012-086672 and English translation (2 pages).

(Continued)

*Primary Examiner* — Lindsay Low
*Assistant Examiner* — Kevin Lathers
(74) *Attorney, Agent, or Firm* — Nixon & Vanderhye P.C.

(57) ABSTRACT

An intake system for an engine includes an intake manifold having a surge tank room and branch passages, and a water-cooling type cooler having a first cooling unit and second cooling units. The surge tank room is disposed on a downstream side of a supercharger in a flow direction of intake air. Supercharged intake air flowing into the surge tank room is distributed among intake ports respectively through the branch passages. The first cooling unit is inserted in the surge tank room, and cools supercharged intake air which has flowed into the intake manifold through heat exchange between supercharged intake air and coolant flowing in the first cooling unit. The second cooling units are inserted respectively in the intake ports, and cool internal EGR gas, which has been recirculated into their corresponding intake ports, through heat exchange between internal EGR gas and coolant flowing in the second cooling units.

6 Claims, 6 Drawing Sheets

(51) Int. Cl.
  *F02M 35/10*  (2006.01)
  *F02M 35/116* (2006.01)
  *F02B 29/04*  (2006.01)
  *F02M 25/07*  (2006.01)

(52) U.S. Cl.
  CPC ....... *F02B 29/0462* (2013.01); *F02M 25/0737* (2013.01); *F02M 35/10032* (2013.01)

(56) References Cited

FOREIGN PATENT DOCUMENTS

| | | | | |
|---|---|---|---|---|
| JP | 2001248448 A | * | 9/2001 | .............. F02B 29/04 |
| JP | 2007-138904 | | 6/2007 | |
| JP | 2007138904 A | * | 6/2007 | .............. F02D 25/07 |
| JP | 2009-270508 | | 11/2009 | |
| JP | 2010-1878 | | 1/2010 | |
| JP | 2010-510425 | | 4/2010 | |
| JP | 4563301 | | 8/2010 | |
| JP | 2011-190744 | | 9/2011 | |

OTHER PUBLICATIONS

Office Action (2 pages) dated Feb. 12, 2014, issued in corresponding Japanese Application No. 2012-086672 and English translation (2 pages).

* cited by examiner

INTAKE SYSTEM FOR INTERNAL COMBUSTION ENGINE

CROSS REFERENCE TO RELATED APPLICATION

This application is based on Japanese Patent Application No. 2012-86672 filed on Apr. 5, 2012, the disclosure of which is incorporated herein by reference.

TECHNICAL FIELD

The present disclosure relates to an intake system for an internal combustion engine in which a water-cooling type cooler is accommodated in a surge tank room of an intake manifold and in each intake port of the engine.

BACKGROUND

Conventional technologies will be described below.

Conventionally, in an internal combustion engine (hereinafter referred to also as a supercharged engine) including a supercharger that feeds supercharged intake air into cylinders, temperature of intake air rises through its compression by the supercharger. When the temperature of intake air rises, knocking is easily generated at the time of high load of the engine in addition to deterioration of filling-up efficiency of intake air with respect to the engine. As a measure against this, there is disposed an intercooler for cooling the supercharged intake air which has been compressed and increased in temperature by the supercharger. The intercooler may be of an air-cooling type or a water-cooling type. Particularly, the water-cooling type intercooler can be disposed in an intake pipe on a downstream side of the supercharger, for example, in a surge tank room of an intake manifold (see, for example, JP-T-2010-510425).

An internal exhaust gas recirculation (EGR) system that opens an intake valve in an exhaust stroke of the engine to be capable of returning a part of exhaust gas into an intake port is known. Internal EGR gas which is the part of exhaust gas returned into the intake port has higher temperature than external EGR gas. The internal EGR gas heats the intake valve, to which fuel injected through an injector that can inject fuel into the intake port is easily attached, and evaporation of fuel is thereby promoted. However, in an intake stroke immediately after being returned into the intake port, the high-temperature internal EGR gas is drawn into the cylinder again together with the high-temperature supercharged intake air compressed by the supercharger. Accordingly, the drawn internal EGR gas still has high temperature, and temperature in a combustion chamber of each cylinder easily rises. The high-temperature internal EGR gas flows into the combustion chamber, and knocking may be caused when the temperature in the combustion chamber becomes high.

For this reason, there is known an internal EGR system that has cylinders and includes one cooling tube and cooling jackets for cooling the internal EGR gas returned into the intake port of each cylinder by coolant (see, for example, Japanese Patent No. 4563301). The cooling tube includes intake port insertion parts which are inserted into vicinity of the intake valve, i.e., deep into the intake port. The coolant flows from an inlet-side cooling tube in a surge tank through the intake port insertion part in each intake port in this order to cool each branch pipe of the intake manifold and each intake port in sequence. Then, the coolant is delivered to the outside through an outlet-side cooling tube in the surge tank. As described above, the coolant flowing through the cooling tube flows serially from an intake port of a cylinder #1 to an intake port of a cylinder #4.

As regards the cooling jackets, the cooling jackets surrounding their corresponding branch pipes are connected to one coolant main pipe inserted into the surge tank through inlet and outlet branch pipes. In this case as well, the coolant flows from the cooling tube through the cooling jacket of the cylinder #1 and is returned to the cooling tube again. The coolant flows from a downstream side of this return part to the cooling tube through the cooling jacket of a cylinder #2 and is returned to the cooling tube again. The coolant flows from a downstream side of this return part to the cooling tube through the cooling jacket of a cylinder #3 and is returned to the cooling tube again. The coolant flows from a downstream side of this return part to the cooling tube through the cooling jacket of a cylinder #4 and is returned to the cooling tube again. In this manner, the coolant flowing through each cooling jacket flows in series from the branch pipe of the cylinder #1 toward the branch pipe of the cylinder #4.

However, in the conventional internal EGR system, both of the supercharged intake air which has flowed into the intake manifold and the internal EGR gas which has flowed into each intake port are cooled by the cooling tube and the cooling jackets. Accordingly, in the case of a four-cylinder engine, there is an issue of deficiency in cooling performance of the supercharged intake air and the internal EGR gas only by means of the cooling tube for each cylinder that is divided into four quarters and the cooling jackets.

The reason for this is that the entire flow of supercharged intake air needs to be cooled with the volume limited. Moreover, in order to efficiently cool the supercharged intake air, it is necessary to expand the volume of the intercooler that is constituted of the cooling tube and the cooling jackets. If the intercooler is extended in an intake air flow direction (direction X) in the intake manifold, a size of the intercooler in the direction X is increased. If the intercooler is extended in a height direction (direction Y) of the intake manifold that is perpendicular to the direction X, it is necessary to increase a gap between fastening points at which the intake manifold and a cylinder head are fastened together. As a result of these, due to the increase of the intercooler in size in the direction X and direction Y, the intake manifold itself grows in size so that installability of the intake manifold in an engine compartment of a vehicle deteriorates.

Furthermore, in the conventional internal EGR system, the coolant flowing through the cooling tube flows serially from the intake port of the cylinder #1 to the intake port of the cylinder #4. For this reason, a distance from a coolant inlet through which the coolant flows into the cooling tube to a coolant outlet through which the coolant flows out of the cooling tube is great in a longitudinal direction (branch pipe arranging direction: direction Z) of the surge tank room. Consequently, the temperature of coolant increases for each intake port in stages through its heat exchange with the internal EGR gas. As a result, a difference is made in cooling performance of the internal EGR gas between the cylinders of the engine.

SUMMARY

The present disclosure addresses at least one of the above issues.

According to the present disclosure, there is provided an intake system for an internal combustion engine having a plurality of cylinders into which supercharged intake air passing through a supercharger is introduced via a plurality of intake ports respectively. The intake system includes an intake manifold and a water-cooling type cooler. The intake manifold includes a surge tank room and a plurality of branch passages. The surge tank room is disposed on a downstream side of the supercharger in a flow direction of intake air. The supercharged intake air flowing into the surge tank room is distributed among the plurality of intake ports respectively through the plurality of branch passages. The water-cooling type cooler includes a first cooling unit and a plurality of second cooling units. The first cooling unit is inserted and arranged in the surge tank room, and is configured to cool the supercharged intake air which has flowed into the intake manifold through heat exchange between the supercharged intake air and coolant flowing in the first cooling unit. The plurality of second cooling units are inserted and arranged respectively in the plurality of intake ports, and are configured to cool internal exhaust gas recirculation (EGR) gas, which has been recirculated into their corresponding plurality of intake ports, through heat exchange between the internal EGR gas and coolant flowing in the plurality of second cooling units.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
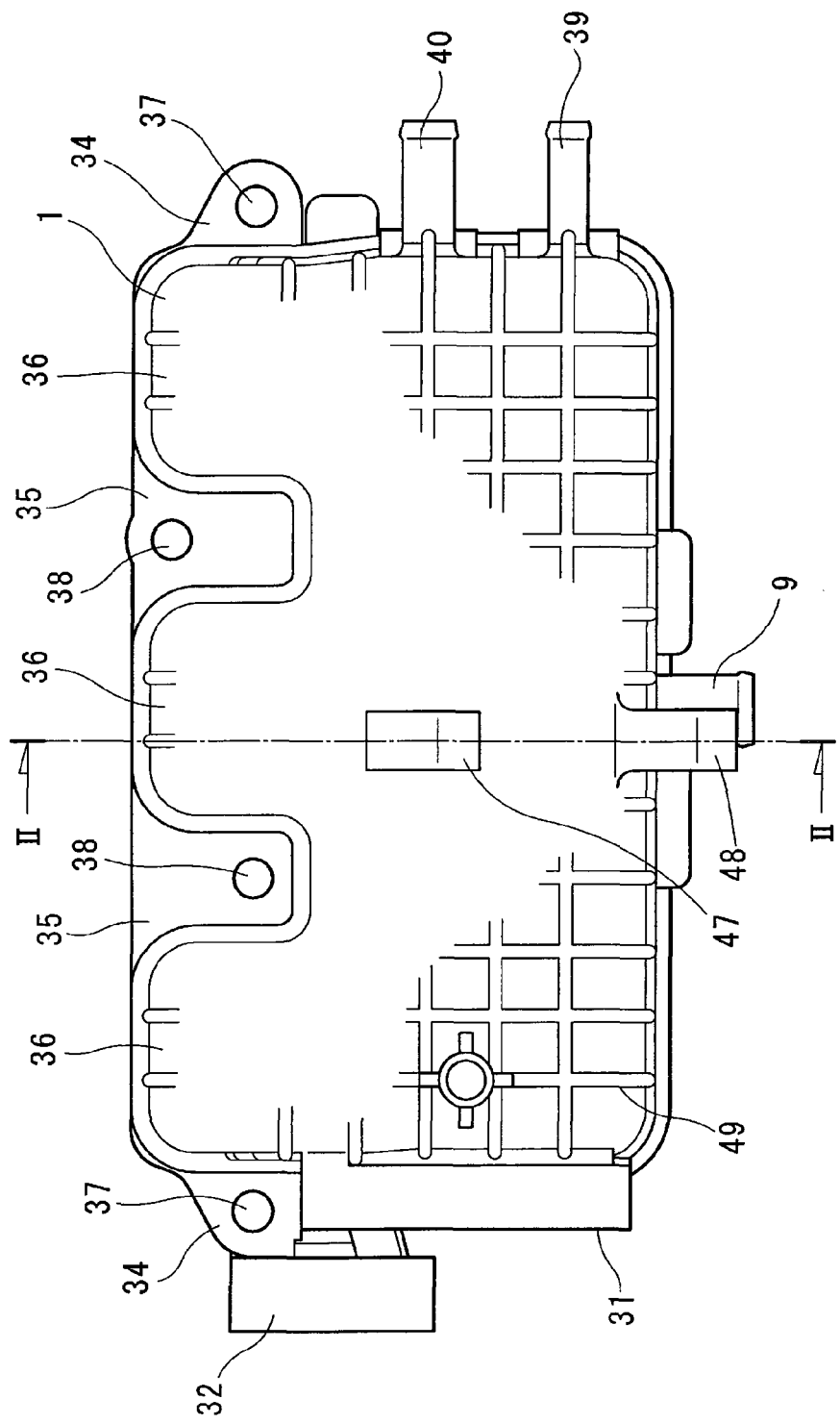
FIG. 1 is a front view illustrating an intake manifold in accordance with an embodiment.
Figure 2:
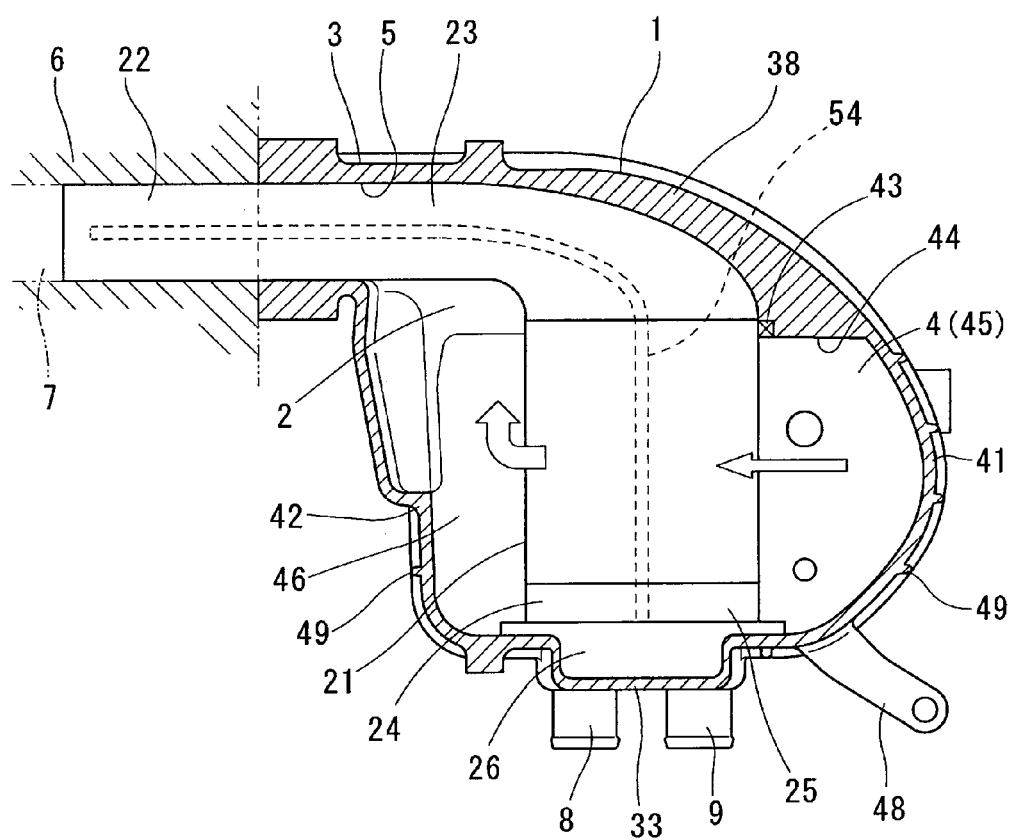
FIG. 2 is a cross-sectional view taken along a line II-II in FIG. 1.

An embodiment will be described in detail below with reference to the accompanying drawings.

Configuration of an intake system for an internal combustion engine according to the embodiment will be described.

FIGS. 1 to 5 illustrate the intake system for the engine of the embodiment.

A control unit (engine control system) for the engine of the present embodiment includes a supercharging system having a turbocharger (supercharger) that supercharges (compresses or pressurizes) intake air which has passed through an air cleaner using the pressure of exhaust gas from the engine, and an internal EGR system that can open an intake valve in an exhaust stroke of the engine to recirculate a part (internal EGR gas) of the exhaust gas into an intake passage. The control unit for the engine is used as an intake air cooling system (intake system for the engine) that cools the supercharged intake air (supercharged air) compressed by a compressor of the turbocharger and the internal EGR gas by a water-cooling type cooler. The water-cooling type cooler of the present embodiment is accommodated to extend from a surge tank 1 of an intake manifold to vicinity of a combustion chamber of each cylinder in a main body of the engine so that the cooler can efficiently cool the internal EGR gas as well as the supercharged air.

The intake manifold of the engine includes the surge tank 1 that reduces pressure fluctuation of the supercharged air which has flowed in from an outlet end of a throttle body, and intake air branch pipes (hereinafter referred to as branch pipes 3) (i.e., for each cylinder) connected respectively to communication holes 2 (i.e., for each cylinder) of this surge tank 1. A surge tank room 4 that temporarily stores the supercharged air which has flowed in through an intake air feed port connected to the throttle body is formed in the surge tank 1. Branch passages 5 that communicate with the surge tank room 4 through their corresponding communication holes 2 are formed respectively in the branch pipes 3. Details of the intake manifold will be hereinafter described.

The engine includes cylinders (first to third cylinders: cylinders #1 to #3). A multi-cylinder gasoline engine (inline three-cylinder engine) that generates the output by heat energy obtained through the combustion of air-fuel mixture of clean air filtered through the air cleaner and fuel injected from an injector (fuel injection valve) in the combustion chamber, is employed for the engine. However, the engine of the embodiment is not limited to the multi-cylinder gasoline engine, and a multi-cylinder diesel engine may be applied to the engine. A four stroke cycle engine that repeats four strokes of an intake stroke, compression stroke, combustion (expansion) stroke, and exhaust stroke as a period (cycle) is employed for the engine.

The engine includes a cylinder block in which the cylinders are arranged in series in a cylinder arranging direction, and a cylinder head 6 which is joined to an upper part of this cylinder block. Three combustion chambers (cylinder bores) are formed in the cylinder arranging direction inside the cylinder block. A piston connected to a crankshaft (output shaft of the engine) via a connecting rod is supported slidably in each cylinder bore in its reciprocating direction. At least one intake port 7 that is connected independently to the combustion chambers of the cylinders, respectively, and at least one exhaust port (not shown) that is connected independently to the combustion chambers of the cylinders, respectively, are provided for the cylinder head 6. Each intake port 7 includes a cooler accommodating space that accommodates a cooler core 22 of the water-cooling type cooler. Spark plugs for igniting the air-fuel mixture which has flowed into the combustion chamber of each cylinder, and the injectors for injecting fuel into their corresponding intake ports 7 are attached to the cylinder head 6. In the case of an in-cylinder injection type injector, fuel is injected into the intake air which has flowed into the combustion chamber of each cylinder.

A coolant circuit (coolant circulation passage) that circulation-supplies coolant to the water-cooling type cooler is provided for the supercharged engine. The coolant circuit includes a coolant pipe that circulation-feeds coolant from a reserve tank into a coolant inlet pipe (coolant pipe 8) of the water-cooling type cooler, a coolant pipe that circulation-feeds coolant from a coolant outlet pipe (coolant pipe 9) of the water-cooling type cooler through a radiator into the reserve tank, and a water pump that generates a circulating flow of coolant in the coolant circuit. Through the heat exchange between coolant and cooling wind (outside air) in the radiator, coolant in a predetermined temperature range (e.g., 35 to 40° C.) is returned to the reserve tank.

The water-cooling type cooler includes tubes 11, 12 arranged in parallel and fins 13, 14 for increasing heat exchanging efficiency between the supercharged air, internal EGR gas, and coolant. The water-cooling type cooler is configured by stacking the tubes 11, 12 and the fins 13, 14 alternately. This water-cooling type cooler is obtained through integration of a first cooler core (hereinafter referred to as a cooler core 21), second cooler cores (hereinafter referred to as cooler cores 22), intermediate connection parts 23, a coolant distribution part 24, a coolant merging part 25, and a tank cap 26. Details of the water-cooling type cooler will be hereinafter described.

Intake valves (not shown) (i.e., for each cylinder) that open or close their corresponding intake port openings which open into the combustion chambers of cylinders are disposed respectively at combustion chamber-side ends of the intake ports 7. Exhaust valves (not shown) (i.e., for each cylinder) that open or close their corresponding exhaust port openings which open into the combustion chambers of cylinders are disposed respectively at combustion chamber-side ends of the exhaust ports. In the exhaust stroke of each cylinder, the exhaust valve of each cylinder opens at a bottom dead center (BDC), therebefore or thereafter; and the exhaust valve of each cylinder closes at a top dead center (TDC), therebefore or thereafter. In the intake stroke of each cylinder, the intake valve of each cylinder opens at the top dead center (TDC), therebefore or thereafter; and the intake valve of each cylinder closes at the bottom dead center (BDC), therebefore or thereafter.

In the cylinder (exhaust cylinder) in the exhaust stroke, valve opening time of the intake valve is advanced by controlling an intake valve timing mechanism so that valve opening periods of the intake valve and exhaust valve overlap. Accordingly, the internal EGR gas can be recirculated into the intake port 7 of the exhaust cylinder. Alternatively, in the cylinder (exhaust cylinder) in the exhaust stroke, the valve opening time of the intake valve is advanced by controlling the intake valve timing mechanism, and valve opening time of the exhaust valve is retarded by controlling the exhaust valve timing mechanism so that the valve opening periods of the intake valve and exhaust valve overlap. Accordingly, the internal EGR gas can be recirculated into the intake port 7 of the exhaust cylinder. The internal EGR gas returned into the intake port 7 of the exhaust cylinder flows into the combustion chamber in the following intake stroke. An intake pipe, in which the intake passage is formed, is connected to the intake ports 7 that are connected independently to the combustion chambers of the cylinders respectively. An exhaust pipe, in which an exhaust passage is formed, is connected to the exhaust ports that are connected independently to the combustion chambers of the cylinders respectively.

The intake pipe includes the compressor disposed on a downstream side of the air cleaner, an electronic throttle disposed on a downstream side of this compressor, and the intake manifold connected to a downstream side of this electronic throttle. The intake pipe is connected to the intake port 7 of each cylinder of the engine. The exhaust pipe includes a turbine disposed on a downstream side of an exhaust manifold, an exhaust gas purifier (e.g., three-way catalyst) disposed on a downstream side of this turbine, and a muffler disposed on a downstream side of this exhaust gas purifier. The exhaust pipe is connected to the exhaust port of each cylinder of the engine.

The turbocharger is a turbosupercharger that includes the compressor provided in the intake passage, and the turbine provided in the exhaust passage and that compresses the intake air flowing through the intake passage by the compressor to feed the compressed supercharged air into the combustion chamber of each cylinder. In this turbocharger, upon rotation of a wheel (turbine wheel) of the turbine by exhaust gas, a shaft coupled with the wheel to be rotatable integrally therewith and an impeller (compressor impeller) of the compressor are rotated, and this impeller compresses the intake air which has passed through the air cleaner. The turbine includes the wheel and a turbine housing. This wheel includes turbine blades in its circumferential direction, and is rotated by exhaust gas pressure of the engine. The compressor includes the impeller and a compressor housing. This impeller includes impeller blades in its circumferential direction, and is coupled with the wheel via the shaft to be rotated (direct coupling drive).

The electronic throttle includes the throttle body that is joined between the compressor and the intake manifold, a throttle valve that is accommodated rotatably in this throttle body to adjust a flow rate of intake air, an electric actuator that opens or closes this throttle valve, and a throttle opening sensor that detects an opening degree (throttle opening angle) of the throttle valve. The electric actuator includes a motor which generates power (torque) to rotate the throttle valve upon supply of electric power, and a deceleration mechanism that decelerates the rotation of this motor to transmit the rotation to a rotation shaft of the throttle valve. The motor is electrically connected to a battery disposed in a vehicle such as an automobile, via a motor drive circuit which is electronically controlled by an engine control unit (electrical control unit: ECU).

Details of the intake manifold of the present embodiment will be described with reference to FIGS. 1 to 5.

The intake manifold includes the surge tank 1 that reduces the pressure fluctuation of the intake air (supercharged air) which has passed through the throttle body, and the branch pipes 3 arranged in parallel in the cylinder arranging direction. Inside the surge tank 1, there is formed the surge tank room 4 having a predetermined internal volume that distributes the supercharged air to the branch passages 5 which are formed respectively in the branch pipes 3. The three communication holes 2 corresponding to the cylinders of the three-cylinder engine respectively are intake outlets that are formed to open at predetermined intervals (at regular intervals) along a longitudinal direction of the surge tank room 4. The branch pipes 3 are connected independently to their corresponding intake ports 7 of the cylinders, and branch from the surge tank room 4. The branch passages 5 are intake passages for guiding the supercharged air which has flowed in from the surge tank room 4 through the corresponding communication holes 2 into the corresponding intake ports 7 for the cylinders.

A tumble control valve for generating a swirl flow (intake air vortex flow, tumble flow) in the longitudinal direction in the combustion chamber of each cylinder is integrated into the intake manifold. The tumble control valve includes tumble valves that open or close their corresponding branch passages 5 of the cylinders, a shaft that is coupled with these tumble valves in synchronization therewith, and an electric actuator that opens or closes the tumble valves. The electric actuator includes a motor which generates power (torque) to rotate the tumble valves upon supply of electric power, and a deceleration mechanism that decelerates the rotation of this motor to transmit the rotation to the shaft. The motor is electrically connected to a battery disposed in a vehicle such as an automobile, via a motor drive circuit which is electronically controlled by an ECU.

The surge tank 1 includes a coupling flange (first joining portion) 31 for fastening and fixing (joining) an outlet end part of the throttle body by way of a fastening means such as bolts. The intake air feed port, through which the supercharged air is introduced from the throttle body to the surge tank room 4, is formed in this coupling flange 31. The surge tank 1 includes a coupling flange 32 for fastening and fixing (joining) the electric actuator of the tumble control valve by way of a fastening means such as bolts. A cooler attaching seat (recessed part) 33 for fixing the water-cooling type cooler is formed through integral moulding at a lower end portion of the surge tank 1 in FIG. 2.

On an upper end side of the surge tank 1 in FIG. 1, there are provided coupling flanges (second joining portions) 34 that are fastened and fixed (joined) to an inlet open end part of the cylinder head 6 by way of a fastening means such as bolts, and bolt fastening portions (third joining portion) 35. The coupling flanges 34 project toward the outside from both sides of the surge tank 1 in its longitudinal direction (cylinder arranging direction: direction Z in FIG. 5). Each of the bolt fastening portions 35 is arranged between its adjacent opposing wall parts 36 among opposing wall parts 36 which are opposed to their respective communication holes 2 (i.e., for each cylinder) with the surge tank room 4 therebetween. Bolt insertion holes (fastening points) 37, 38, through which bolts screwed into bolt fastening holes of the cylinder head 6 are inserted, are formed respectively in the coupling flanges 34 and the bolt fastening portions 35. A pipe joint 39 for attaching a pipe for blow-by gas reduction, and a pipe joint 40 for attaching a negative pressure introduction pipe through which intake air negative pressure is supplied to a brake booster are provided for the surge tank 1 to project laterally from an outer surface of the surge tank 1.

The surge tank 1 includes an opposing wall part 41 that is opposed to the cooler core 21 of the water-cooling type cooler with a predetermined distance therebetween; and an opposing wall part 42 that is opposed to the coolant distribution part 24 which is an inlet tank part of the water-cooling type cooler and the coolant merging part 25 which is an outlet tank part of the cooler or that is opposed to the cooler core 21 of the water-cooling type cooler with a predetermined distance therebetween. The opposing wall parts 41, 42 include an intake air sealing part (a sealing member 43 and a rib 44) that is in contact with the cooler core 21 to seal a clearance between the cooler core 21 and the opposing wall parts 41, 42. The rib 44 projects from the opposing wall part 41 toward an upstream end face of the cooler core 21. The communication holes 2 (i.e., for each cylinder) pass through the opposing wall part 42 to communicate respectively with the branch passages 5.

Figure 3:
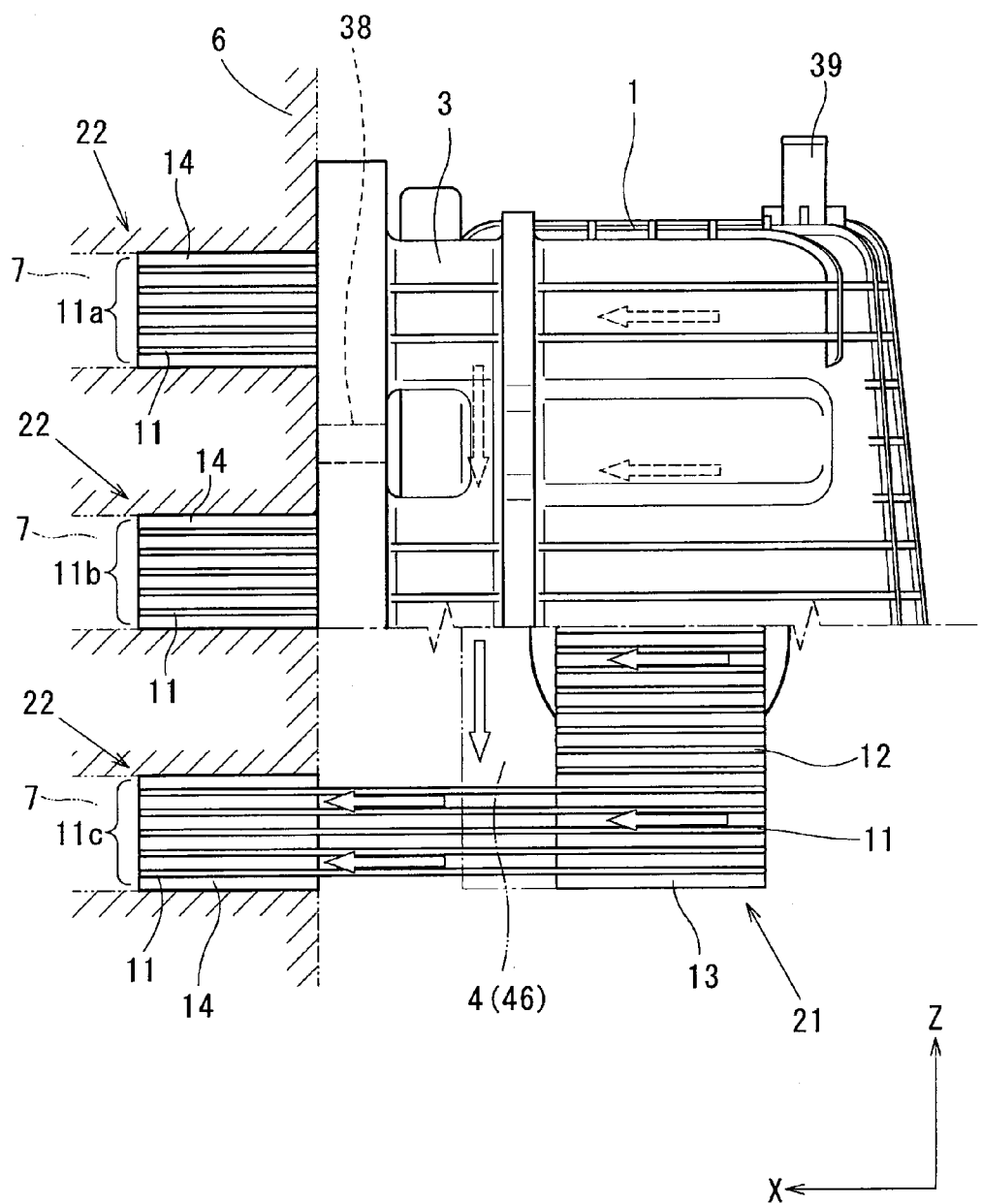
FIG. 3 is a schematic view roughly illustrating a configuration of a water-cooling type cooler according to the embodiment.
Figure 4:
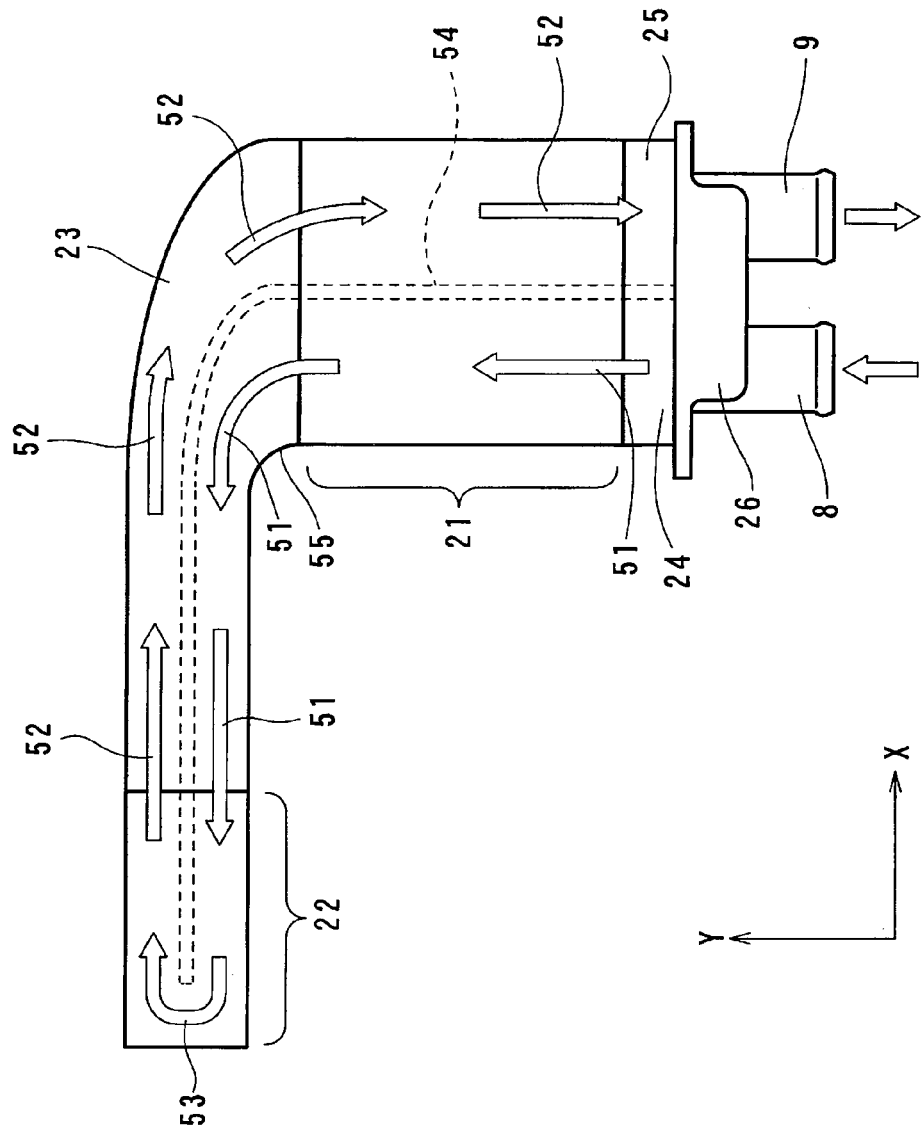
FIG. 4 is a schematic view roughly illustrating the configuration of the water-cooling type cooler according to the embodiment.
Figure 5:
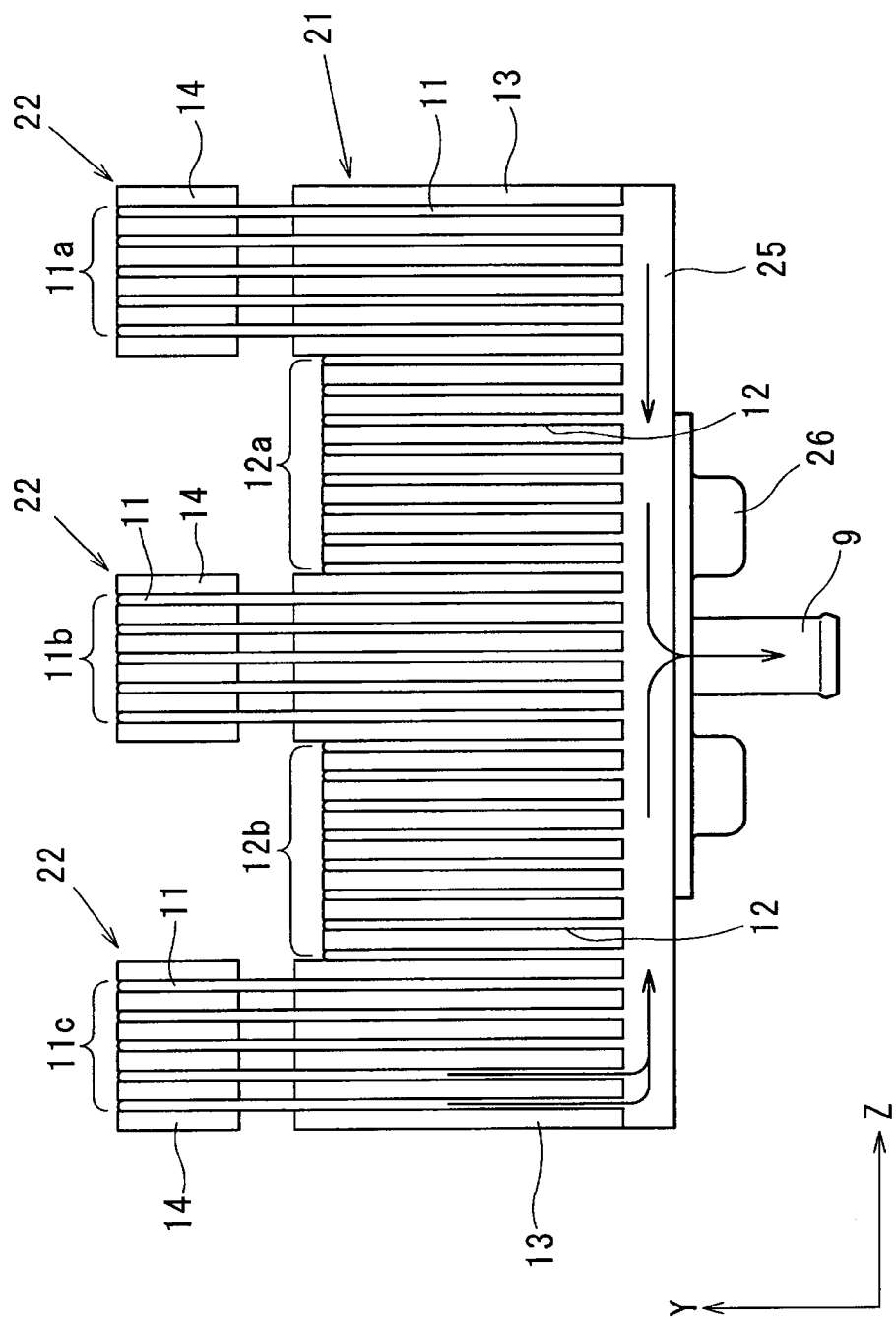
FIG. 5 is a schematic view roughly illustrating the configuration of the water-cooling type cooler according to the embodiment.

The surge tank room 4 includes the cooler accommodating space that accommodates the cooler core 21, a surge chamber 45 that is located on an upstream side of this cooler accommodating space, and a surge chamber 46 that is located on a downstream side of the cooler accommodating space. The surge chamber 45 is a predetermined volume space that is formed between the cooler core 21 and the opposing wall part 41. In this surge chamber 45, the supercharged air can flow in the longitudinal direction of the surge tank room 4 (direction Z in FIGS. 3 and 5). The surge chamber 46 is a predetermined volume space formed between the cooler core 21 and the opposing wall part 42. In this surge chamber 46, the supercharged air can flow in the longitudinal direction of the surge tank room 4 (direction Z in FIGS. 3 and 5). The branch passages 5 respectively include cooler accommodating spaces that accommodate the corresponding intermediate connection parts 23. Hooks 47, 48 for attaching (or hooking or bundling) another component (engine auxiliary machinery or wire harness) are provided for the surge tank 1 of the intake manifold. A grid-like reinforcing rib 49 extending in a direction Y in FIGS. 4 and 5 and in the direction Z in FIGS. 3 and 5 is provided on the outer surface of the surge tank 1.

Details of the water-cooling type cooler of the present embodiment will be described with reference to FIGS. 1 to 5.

The water-cooling type cooler is a U-turn flow type intercooler and EGR cooler for cooling both of the supercharged air and the internal EGR gas through the heat exchange of the high-temperature supercharged air and the high-temperature internal EGR gas with the coolant. The water-cooling type cooler is a heat exchanger for exchanging heat between the supercharged air and internal EGR gas flowing outside the tubes 11, 12 and the coolant flowing inside the tubes 11, 12.

The water-cooling type cooler includes the cooler core 21 that is inserted and arranged in the cooler accommodating space of the surge tank 1, the cooler cores 22 that are inserted and arranged respectively in the cooler accommodating spaces of the cylinder head 6, and the intermediate connection parts 23 that are inserted and arranged correspondingly in the respective cooler accommodating spaces of the branch pipes 3. The water-cooling type cooler includes the coolant distribution part 24 that distributes the coolant which has flowed in from the outside (reserve tank) through the coolant pipe 8 among the tubes 11, 12 which constitute the cooler cores 21, 22; and the coolant merging part 25 that merges together the coolant to flow the coolant out from the tubes 11, 12 through the coolant pipe 9 to the outside (radiator). The coolant pipes 8, 9 are provided at the tank cap 26 that covers each opening of the coolant distribution part 24 and the coolant merging part 25. These coolant pipes 8, 9 project toward the outside of the surge tank 1 through the cooler attaching seat 33. The tank cap 26 is held on the cooler attaching seat 33.

The tubes 11, 12 are tubes (flat tubes) having flat shapes that are configured by joining together a pair of molded plates (metal materials) through brazing so that coolant passages through which the coolant flows are formed between opposed surfaces (inner wall surfaces) of the pair of molded plate. Inside each of the tubes 11, 12, there are provided a coolant passage 51 which is a forward passage, a coolant passage 52 which is a return passage, a U-shaped part (coolant passage 53) that connects together these coolant passage 51 and coolant passage 52, and a center partition 54 that divides the coolant passage 51 from the coolant passage 52. The fins 13, 14 are obtained by forming a thin belt-like metal plate into predetermined shapes. Louvers (not shown) for improving heat exchanging efficiency are formed at parts of these fins 13, 14 on their both sides in the thickness direction by which the supercharged air flows (hereinafter referred to as supercharged air passages). A fin (corrugated fin) having a corrugated shape that is excellent in performance of cooling of the supercharged air and internal EGR gas is used for each of the fins 13, 14. Alternatively, a plate fin may be used for each of the fins 13, 14. Moreover, a corrugated fin and plate fin may be used in combination for each of the fins 13, 14.

The cooler cores 21, 22 respectively include side plates for reinforcing the cooler cores 21, 22 further outward of outermost fins 13, 14 that are arranged on both outermost sides in a tube stacking direction (the longitudinal direction of the surge tank room 4, or a width direction of the intake ports 7: direction Z in FIGS. 3 and 5) as a result of stacking the tubes 11, 12 and the fins 13, 14 alternately. Accordingly, the side plates extending in a direction that is parallel to a longitudinal direction of the tubes 11, 12 (direction Y in FIGS. 4 and 5, direction X in FIGS. 3 and 4) are arranged respectively on both end sides of the cooler cores 21, 22 in the tube stacking direction. The side plates are connected respectively to the outermost fins 13, 14 on both sides to constitute reinforcing members for keeping high the strength of the cooler cores 21, 22.

The cooler core 21 includes the tubes 11, 12 that are arranged in parallel in the longitudinal direction of the surge tank room 4 at predetermined intervals (at regular intervals), and the fins 13 that are arranged between their adjacent tubes 11, 12. The cooler core 21 constitutes a first cooling unit (supercharged intake air cooling unit, heat exchanger main body) that cools the supercharged air which has flowed into the surge tank room 4 of the surge tank 1 through its heat exchange with the coolant flowing in each of the coolant passages 51, 52 of the tubes 11, 12. This cooler core 21 is disposed to cover the entire passage cross section of the surge tank room 4 in its longitudinal direction. The cooler core 22 includes the tubes 11 that are arranged in parallel in the width direction of the intake ports 7 at predetermined intervals (at regular intervals), and the fins 14 that are arranged between their adjacent tubes 11. The cooler core 22 constitutes a second cooling unit (internal EGR cooling unit, heat exchanger main body) that cools the internal EGR gas which has flowed into each intake port 7 of the cylinder head 6 through its heat exchange with the coolant flowing in each of the coolant passages 51 to 53 of the tubes 11. This cooler core 22 is disposed to cover the entire passage cross section of each intake port 7 in its width direction. The intermediate connection part 23 is a junction part that includes the tubes 11, 12 arranged in parallel in the longitudinal direction of the surge tank room 4 at predetermined intervals (at regular intervals) and that connects together the cooler core 21 and the cooler core 22. The tubes 11, 12 which constitute the intermediate connection part 23 respectively include bent parts 55 that are bent perpendicularly because the branch passages 5 are crooked. The coolant distribution part 24 and the coolant merging part 25 are concentratedly arranged at end parts (one end parts) of the tubes 11, 12 on the opposing wall part 41-side, and are connected to one end parts of the tubes 11, 12. The coolant distribution part 24 and the coolant merging part 25 are located on a different (opposite) side of the cooler core 21 of the water-cooling type cooler from the cooler core 22.

The tubes 11, 12 include plural (three) long tube groups 11a to 11c that pass from the surge tank room 4 through the branch passages 5 and reach the intake ports 7, and plural (two) short tube groups 12a, 12b that remain in the surge tank room 4. The long tube groups 11a to 11c include the coolant passages 51, each of which extends from the coolant distribution part 24 through the surge tank room 4, its corresponding communication hole 2, and its corresponding branch passage 5 to the vicinity of a rear side of its corresponding intake port 7 (vicinity of intake valve); the coolant passages 52, each of which extends from the vicinity of a rear side of its corresponding intake port 7 (vicinity of intake valve) through its corresponding branch passage 5, its corresponding communication hole 2, and the surge tank room 4 to the coolant merging part 25; and the coolant passages 53, each of which connects together the ends of its corresponding coolant passages 51, 52. Accordingly, the U-shaped coolant passages 51 to 53 are formed respectively in the tubes 11 which constitute the long tube groups 11a to 11c. The short tube groups 12a, 12b include the coolant passages 51, each of which extends from the coolant distribution part 24 through the surge tank room 4 to the vicinity of the inner wall surface of the opposing wall part 42; the coolant passages 52, each of which extends from the vicinity of the inner wall surface of the opposing wall part 42 through the surge tank room 4 to the coolant merging part 25; and the coolant passages 53, each of which connects together the ends of its corresponding coolant passages 51, 52. Accordingly, the U-shaped coolant passages 51 to 53 are formed respectively in the tubes 12 which constitute the short tube groups 12a, 12b.

Operation of the intake air cooling system of the present embodiment will be described briefly with reference to FIGS. 1 to 5.

First, the internal EGR gas that has flowed back (recirculated) into the intake port 7 of the exhaust cylinder by opening the intake valve in the exhaust stroke in which the exhaust valve opens, is distributed among the supercharged air passages defined between the adjacent tubes 11, 12 of the water-cooling type cooler. The internal EGR gas distributed among the supercharged air passages is cooled through its heat exchange with the coolant circulating through the coolant passages 51 to 53 of the tubes 11 which constitute the cooler core 22. The supercharged air, which has been compressed by the compressor of the turbocharger to have high temperature, flows into the surge chamber 45 of the surge tank 1 of the intake manifold to be distributed among the supercharged air passages defined between the adjacent tubes 11, 12 of the water-cooling type cooler. The supercharged air distributed among the supercharged air passages is cooled through its heat exchange with the coolant circulating through the coolant passages 51, 52 of the tubes 11, 12 which constitute the cooler core 21.

The cooled supercharged air flows from each supercharged air passage into the surge chamber 46 to be distributed to the branch passage 5 that communicates with the communication hole 2 of an intake cylinder in which the intake valve is opened. The supercharged air, which has flowed from the branch passage 5 of the intake cylinder into the intake port 7, is fed into the combustion chamber of the intake cylinder together with the internal EGR gas which has been returned into the intake port 7 and cooled. Accordingly, the high-temperature internal EGR gas flows into the combustion chamber of each cylinder to make avoidable a defect of temperature rise in the combustion chamber. Thus, generating of knocking can be limited. In addition, the amount of emission of nitrogen oxides (NOx) contained in the exhaust gas discharged from the combustion chamber of each cylinder can be limited.

Effects of the embodiment will be described below.

As described above, in the intake air cooling system of the present embodiment, the cooler core 21 of the water-cooling type cooler is inserted and arranged in the surge tank room 4 of the surge tank 1, and the cooler cores 22 are inserted and arranged respectively in the intake ports 7. Accordingly, the number of components and assembly man-hours can be reduced to reduce costs of the entire system. Moreover, the water-cooling type cooler which is obtained by the integration of the cooler cores 21, 22, the intermediate connection part 23, the coolant distribution part 24, and the coolant merging part 25 is integrated into the surge tank 1, the respective branch pipes 3 and the cylinder head 6. Accordingly, the number of components and assembly man-hours can be reduced to reduce the costs.

Furthermore, the supercharged air and internal EGR gas can be efficiently cooled by the coolant flowing in the tubes 11, 12 which constitute the cooler cores 21, 22. Accordingly, cooling performance of the supercharged air and the internal EGR gas can be improved without causing growth in size of the intake manifold and the water-cooling type cooler and deterioration in their installability. Additionally, the long tube groups 11a to 11c (i.e., for each cylinder) are arranged in parallel in the longitudinal direction of the surge tank room 4 and in the width direction of the intake ports 7 (direction Z in FIGS. 3 and 5). More specifically, the tubes 11 are arranged in parallel from the intake port 7 of the cylinder #1 through the intake port 7 of the cylinder #3. Accordingly, the coolant distributed from the coolant distribution part 24 among the tubes 11 can flow in parallel from the intake port 7 of the cylinder #1 to the intake port 7 of the cylinder #3. As a result, a difference (variation) in cooling performance of the internal EGR gas between the cylinders of the engine can be curbed.

Figure 6:
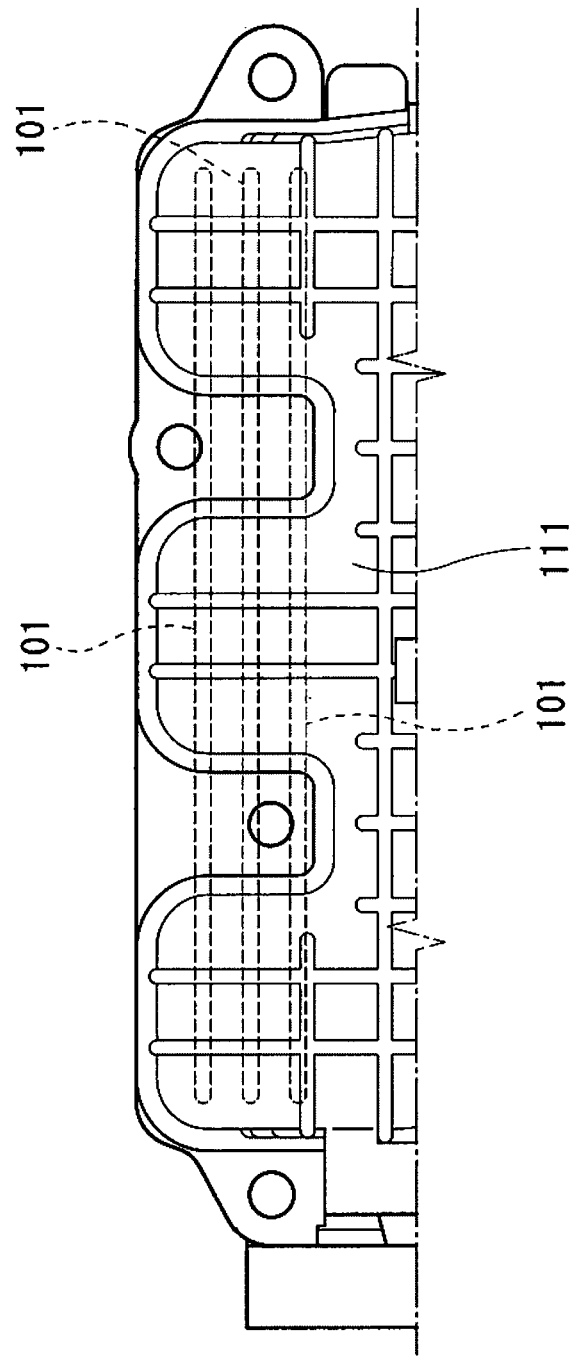
FIG. 6 is a front view illustrating fastening points of an intake manifold in accordance with a comparative example.

Moreover, there are provided the tubes 11, 12 that are arranged in parallel in the longitudinal direction of the surge tank room 4, in the width direction of the branch passages 5 and in the width direction of the intake ports 7. Accordingly, even though the tubes 11, 12 are made as two kinds: the long tube groups 11a to 11c and the short tube groups 12a, 12b to have such shapes that bypass (avoid) the bolt insertion holes (fastening points) 37, 38 between the surge tank 1 of the intake manifold and the cylinder head 6 of the engine, the respective coolant passages 51 to 53 of the tubes 11, 12 are easily set. Therefore, the tubes 11, 12 are produced to have two types: the long tube groups 11a to 11c which extend into the respective intake ports 7, and the short tube groups 12a, 12b which end in the surge tank 1. Consequently, the tubes 11, 12 can be arranged in parallel in the longitudinal direction of the surge tank room 4 (direction Z in FIGS. 3 and 5). As a result, the gaps between the bolt insertion holes 37, 38 do not need to be increased, which has the advantage that a constrain condition for designing the engine main body is not created. As illustrated in FIG. 6, if tubes 101 are arranged in parallel in a length direction of the surge tank room (direction Y in FIGS. 4 and 5), the tubes 101 interfere with the fastening points, so that it is difficult to attach an intake manifold to an engine main body (e.g., cylinder head).

Furthermore, there is set the surge chamber 46 in which the supercharged air can flow at a position opposed to the coolant distribution part 24 and the coolant merging part 25 of the water-cooling type cooler, or between a downstream end face of the cooler core 21 and the opposing wall part 42 of the surge tank 1. Accordingly, the entire cooler core 21 in the surge tank 1 can be used as a portion for cooling the supercharged air. As a result, the supercharged air cooled by the entire cooler core 21 flows into the cooler cores 22 in their respective intake ports 7 through the branch passages 5. Thus, an increase in size of the surge tank room 4 in its height direction (direction X in FIGS. 3 and 4) can be prevented. Without this surge chamber 46, the entire cooler core 21 cannot be used along the entire longitudinal direction of the surge tank room 4.

Additionally, there are provided the rib 44 that projects from the inner wall surface of the opposing wall part 41 of the surge tank 1 to be in contact with the upstream end face of the cooler core 21; and the sealing member 43 for sealing the clearance between the upstream end face of the cooler core 21 and the end surface of the rib 44. Accordingly, the supercharged air which has flowed into the surge chamber 45 does not flow preferentially toward the cooler cores 22, and the entire supercharged air flows through the supercharged air passages of the cooler core 21. Therefore, the performance in cooling the supercharged air can be improved. If the intake air sealing part (the sealing member 43, the rib 44) is not provided, because of intake air resistance, the supercharged air which has flowed into the surge chamber 45 flows into the cooler cores 22 without passing through the supercharged air passages of the cooler core 21, so that the performance in cooling the supercharged air is decreased.

Modifications to the above embodiment will be described below.

In the present embodiment, the water-cooling type cooler is accommodated in the intake manifold. Alternatively, a function of an air-cooling type cooler may be used in combination by configuring the intake manifold from a metal material, and by providing a fin for releasing the heat to outside air (cooling wind) on the outer surface of the intake manifold. The coolant may flow into the water-cooling type cooler through the coolant pipe 9, and may flow out of the water-cooling type cooler through the coolant pipe 8.

In the present embodiment, the water-cooling type cooler which is accommodated in the intake manifold and the engine main body (cylinder head 6) is used as the water-cooling type intercooler (cooler core 21) for cooling the supercharged air, and the water-cooling type internal EGR cooler (cooler core 22) for cooling the internal EGR gas. Alternatively, the water-cooling type cooler may be used as not only the water-cooling type intercooler (cooler core 21) and the water-cooling type internal EGR cooler (cooler core 22) as but also a water-cooling type external EGR cooler (cooler core) for cooling external EGR gas. Moreover, the coolant circulating through the coolant circuit (including the reserve tank, the water pump, and the radiator) that is provided exclusively for cooling the supercharged air and internal EGR gas is used for the coolant. Alternatively, coolant circulating through an engine coolant circuit (including a water jacket, a water pump and a radiator) for cooling the engine main body (the cylinder block and the cylinder head 6) may be used. Furthermore, another cooling medium (liquid) such as cooling oil may be used for the coolant.

In addition, not only the multi-cylinder gasoline engine but also a multi-cylinder diesel engine may be used for the internal combustion engine disposed in a vehicle such as an automobile (e.g., a driving source of a generator, compressor, blower, for example, or an engine for vehicle traveling). The turbocharger is used for a supercharger. However, a supercharger, electric supercharger, or electric compressor may also be used. The hooks 47, 48 and the reinforcing rib 49, which are arranged for the intake manifold, do not necessarily be provided. The surge tank 1 and the branch pipes 3 may be separately configured.

To sum up, the intake system for the engine of the above embodiment can be described as follows.

According to the first aspect of the disclosure, there is provided the water-cooling type cooler that cools the supercharged intake air through heat exchange between the coolant flowing through the inside of the first cooling unit 21, and the supercharged intake air which has flowed into the intake manifold 1, 3; and that cools the internal EGR gas through heat exchange between the coolant flowing inside the second cooling units 22, and the internal EGR gas which has been recirculated into the corresponding intake ports 7. The first cooling unit 21 is inserted and arranged in the surge tank room 4 of the intake manifold 1, 3; and the second cooling units 22 are inserted and arranged respectively in the intake ports 7 of the engine. Accordingly, the number of components and attachment man-hours can be reduced, which leads to the cost reduction. Moreover, the supercharged intake air which has flowed into the intake manifold 1, 3 is cooled by the coolant flowing inside the first cooling unit 21 of the water-cooling type cooler; and the internal EGR gas which has returned into the intake port 7 for each cylinder is cooled by the coolant flowing through the inside of the second cooling unit 22 of the water-cooling type cooler. As a result, cooling performance of the supercharged intake air and the internal EGR gas can be improved without causing growth in size of the intake manifold 1, 3 and the water-cooling type cooler and deterioration in their installability. In addition, a difference in cooling performance of the internal EGR gas between the cylinders can be limited.

According to the second aspect of the disclosure, there is provided the water-cooling type cooler, i.e., the integration of the first cooling unit 21 that cools the supercharged intake air which has flowed into the intake manifold 1, 3; and the second cooling units 22 that cool the internal EGR gas which has been recirculated into the corresponding intake ports 7. Accordingly, the number of components and attachment man-hours can be reduced, which leads to the cost reduction. According to the third aspect of the disclosure, there is provided the water-cooling type cooler including the intermediate connection parts 23 that connect together the first cooling unit 21 and the second cooling units 22. The intermediate connection parts 23 are inserted and arranged respectively in the branch passages 5 of the intake manifold 1, 3. Accordingly, the first cooling unit 21 and the second cooling units 22 can be combined together.

According to the fourth aspect of the disclosure, the water-cooling type cooler including the tubes 11, 12 which are arranged in parallel in the longitudinal direction of the surge tank room 4, in the width direction of the branch passages 5, and in the width direction of the intake ports 7 exchanges heat between the supercharged intake air or internal EGR gas flowing outside the tubes 11, 12, and the coolant flowing inside the tubes 11, 12. According to the fifth aspect of the disclosure, there is provided the water-cooling type cooler including the coolant distribution part 24 that distributes the coolant, which has flowed in from the outside, among the tubes 11, 12; and the coolant merging part 25 that merges together the coolant from the tubes 11, 12 to flow the coolant out to the outside. The coolant distribution part 24 and the coolant merging part 25 are connected to the ends of the tubes 11, 12.

According to the eighth aspect of the disclosure, there are provided the tubes 11, 12 which are arranged in parallel in the longitudinal direction (direction Z) of the surge tank room 4, in the width direction (direction Z) of the branch passages 5 and in the width direction (direction Z) of the intake ports 7. Accordingly, even though two types (11a to 11c; and 12a, 12b) of the tubes are produced to have the shapes to avoid the fastening points 37, 38 between the intake manifold 1, 3 and the engine, the flows of the coolant in the tubes 11, 12 can be set. Thus, the two types of the tubes 11, 12: those reaching into the intake ports 7 and those ending inside the intake manifold 1, 3 are made, and the tubes 11, 12 can thereby be arranged in the longitudinal direction of the surge tank room 4. Furthermore, by arranging the tubes 11, 12 in the direction Z, the coolant can flow in parallel, so that a difference is not made in cooling performance between the cylinders.

According to the ninth aspect of the disclosure, the surge chamber 45, 46 through which the supercharged intake air can flow is set between the first cooling unit 21 and the opposing wall part 41, 42. Accordingly, the entire first cooling unit 21 in the intake manifold 1, 3 can be used as a unit for cooling the supercharged intake air. As a result, the supercharged intake air which has been cooled by the entire first cooling unit 21 can flow into the second cooling unit 22 in each intake port 7. Therefore, the increase in size of the surge tank room 4 in its height direction can be prevented. According to the tenth aspect of the disclosure, there is provided the intake manifold 1, 3 including the intake air sealing part 43, 44 that is in contact with the first cooling unit 21 for sealing a clearance between the first cooling unit 21 and the intake manifold 1, 3. As described above, by providing the intake air sealing part 43, 44 in the intake manifold 1, 3 on the upstream side of the first cooling unit 21 in the intake air flow direction, the supercharged intake air which has flowed into the intake manifold 1, 3 does not flow preferentially toward the second cooling units 22, and flows toward the first cooling unit 21, so that performance in cooling the supercharged intake air can be improved.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An intake system for an internal combustion engine having a plurality of cylinders into which supercharged intake air passing through a supercharger is introduced via a plurality of intake ports respectively, the intake system comprising:
   an intake manifold that includes:
      a surge tank room that is disposed on a downstream side of the supercharger in a flow direction of intake air; and
      a plurality of branch passages through which the supercharged intake air flowing into the surge tank room is distributed among the plurality of intake ports respectively; and
   a water-cooling type cooler that includes:
      a first cooling unit that is inserted and arranged in the surge tank room and that is configured to cool the supercharged intake air which has flowed into the intake manifold through heat exchange between the supercharged intake air and coolant flowing in the first cooling unit; and
      a plurality of second cooling units that are inserted and arranged respectively in the plurality of intake ports and that are configured to cool internal exhaust gas recirculation (EGR) gas, which has been recirculated into their corresponding plurality of intake ports, through heat exchange between the internal EGR gas and coolant flowing in the plurality of second cooling units, wherein:
   the water-cooling type cooler further includes a plurality of intermediate connection parts that respectively connect together the first cooling unit and the plurality of second cooling units;
   the plurality of intermediate connection parts are inserted and arranged respectively in the plurality of branch passages;
   the intake manifold further includes:
      an opposing wall part that is opposed to the first cooling unit with a predetermined distance between the opposing wall part and the first cooling unit; and
      a surge chamber which is located between the first cooling unit and the opposing wall part and through which the supercharged intake air is capable of flowing;
   the water-cooling type cooler further includes a plurality of tubes that are arrange in parallel in a longitudinal direction of the surge tank room, in a width direction of the plurality of branch passages, and in a width direction of the plurality of intake ports;
   the first cooling units, the plurality of second cooling units, and the plurality of intermediate connection parts are constituted of the plurality of tubes; and
   coolant taken in from outside is distributed among the plurality of tubes, so that coolant flows in parallel through the first cooling units, the plurality of intermediate connection parts, and the plurality of second cooling units, respectively and then merges together to be sent out to the outside.

2. The intake system according to claim 1, wherein the water-cooling type cooler is an integration of the first cooling unit and the plurality of second cooling units.

3. The intake system according to claim 1, wherein:
the water-cooling type cooler further includes:
a coolant distribution part that is configured to distribute coolant, which has flowed into the water-cooling type cooler from outside, among the plurality of tubes; and
a coolant merging part that is configured to merge together coolant from the plurality of tubes to flow the coolant out to the outside; and
the coolant distribution part and the coolant merging part are connected to end portions of the plurality of tubes.

4. The intake system according to claim 3, wherein the plurality of branch passages are arranged in parallel in the longitudinal direction of the surge tank room.

5. The intake system according to claim 3, wherein the coolant distribution part or the coolant merging part is located on an opposite side of the first cooling unit from the plurality of second cooling units.

6. The intake system according to claim 1, wherein:
the intake manifold further includes an intake air sealing part that is in contact with the first cooling unit; and
the intake air sealing part is configured to seal a clearance between the intake manifold and the first cooling unit.

\* \* \* \* \*